United States Patent
Walker et al.

(10) Patent No.: US 10,011,075 B2
(45) Date of Patent: Jul. 3, 2018

(54) SYSTEMS AND METHODS OF POST-PROCESSING FEATURES FOR ADDITIVE FABRICATION

(71) Applicant: Formlabs, Inc., Somerville, MA (US)

(72) Inventors: Will Walker, Boston, MA (US); Matthew Keeter, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 871 days.

(21) Appl. No.: 14/501,967

(22) Filed: Sep. 30, 2014

(65) Prior Publication Data

US 2015/0145171 A1  May 28, 2015

Related U.S. Application Data

(60) Provisional application No. 62/039,615, filed on Aug. 20, 2014, provisional application No. 61/907,446, filed on Nov. 22, 2013.

(51) Int. Cl.
| | |
|---|---|
| *B33Y 10/00* | (2015.01) |
| *B29C 67/00* | (2017.01) |
| *B33Y 40/00* | (2015.01) |
| *B29C 64/135* | (2017.01) |
| *B29C 64/40* | (2017.01) |
| *B29L 9/00* | (2006.01) |

(52) U.S. Cl.
CPC ........ *B29C 67/0066* (2013.01); *B29C 64/135* (2017.08); *B29C 64/40* (2017.08); *B33Y 10/00* (2014.12); *B33Y 40/00* (2014.12); *B29L 2009/00* (2013.01)

(58) Field of Classification Search
None
See application file for complete search history.

(56) References Cited

U.S. PATENT DOCUMENTS

| | | | |
|---|---|---|---|
| 2004/0141018 A1* | 7/2004 | Silverbrook | B22F 3/008 347/4 |
| 2010/0262272 A1* | 10/2010 | Shkolnik | B29C 67/0088 700/120 |
| 2011/0304074 A1* | 12/2011 | Wang | B33Y 10/00 264/296 |
| 2012/0133080 A1* | 5/2012 | Moussa | B33Y 10/00 264/308 |
| 2012/0308805 A1* | 12/2012 | Sella | B29C 31/10 428/222 |

* cited by examiner

*Primary Examiner* — Christina Johnson
*Assistant Examiner* — Mohammad M Ameen
(74) *Attorney, Agent, or Firm* — Wolf, Greenfield & Sacks, P.C.

(57) ABSTRACT

According to some aspects, a method of additive fabrication wherein a plurality of layers of material are formed on a build platform is provided. The method comprises forming a raft structure in contact with the build platform, the raft structure formed from one or more layers of material and comprising at least one removal pocket adjacent to the build platform and forming additional material in contact with the raft structure. According to some aspects, an additive fabrication apparatus configured to form a plurality of layers of material on a build platform is provided. The apparatus comprises the build platform, and at least one controller configured to form a raft structure in contact with the build platform, the raft structure formed from one or more layers of material and comprising at least one removal pocket adjacent to the build platform, and form additional material in contact with the raft structure.

16 Claims, 12 Drawing Sheets

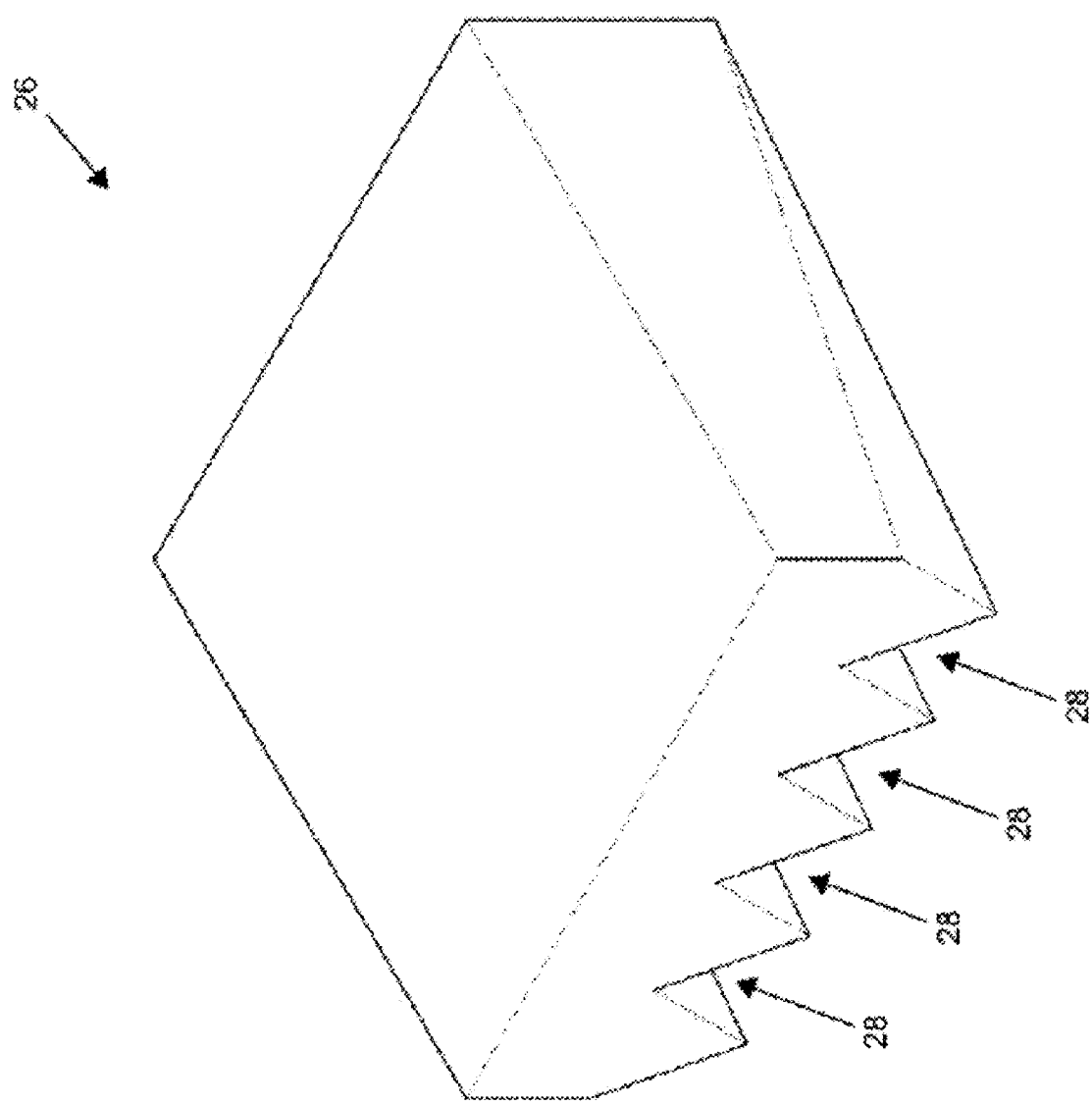

SYSTEMS AND METHODS OF POST-PROCESSING FEATURES FOR ADDITIVE FABRICATION

CROSS REFERENCE TO RELATED APPLICATIONS

The present application claims the benefit of U.S. Provisional Patent Application No. 61/907,446, filed Nov. 22, 2013, titled "Additive Fabrication Using Raft Structure with Improved Removability," and U.S. Provisional Patent Application No. 62/039,615, filed Aug. 20, 2014, titled "Additive Part Formation with Improved Post-processing Features," both of which are hereby incorporated by reference in their entireties.

FIELD OF INVENTION

The present invention relates generally to systems and methods for additive fabrication (e.g., 3-dimensional printing) that form structures to assist in post-processing of an associated fabricated part.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the bottom surface of the build platform. Subsequent to fabrication of an object, one or more post-processing steps may be performed to clean, further cure and/or strip unwanted material from the object.

SUMMARY

Systems and methods for additive fabrication that form structures to assist in post-processing of an associated fabricated part are provided.

Some embodiments include a method of additive fabrication wherein a plurality of layers of material are formed on a build platform, comprising forming a raft structure in contact with the build platform, the raft structure formed from one or more layers of material and comprising at least one removal pocket adjacent to the build platform, and forming additional material in contact with the raft structure.

Some embodiments provide an additive fabrication apparatus configured to form a plurality of layers of material on a build platform, comprising the build platform, and at least one controller configured to form a raft structure in contact with the build platform, the raft structure formed from one or more layers of material and comprising at least one removal pocket adjacent to the build platform, and form additional material in contact with the raft structure.

Some embodiments provide at least one non-transitory computer readable medium comprising an executable program that, when executed, causes a computer to perform a method of obtaining a representation of a three-dimensional object, and generating a representation of a part, the part including a raft structure and the three-dimensional object in contact with one another at a base of the three-dimensional object, wherein the raft structure comprises at least one removal pocket.

The foregoing summary is provided by way of illustration and is not intended to be limiting.

BRIEF DESCRIPTION OF DRAWINGS

The accompanying drawings are not intended to be drawn to scale. For purposes of clarity, not every component may be labeled in every drawing. In the drawings:

FIG. 4 depicts an alternate pocket structure of a raft, according to some embodiments;

DETAILED DESCRIPTION

Figure 1:
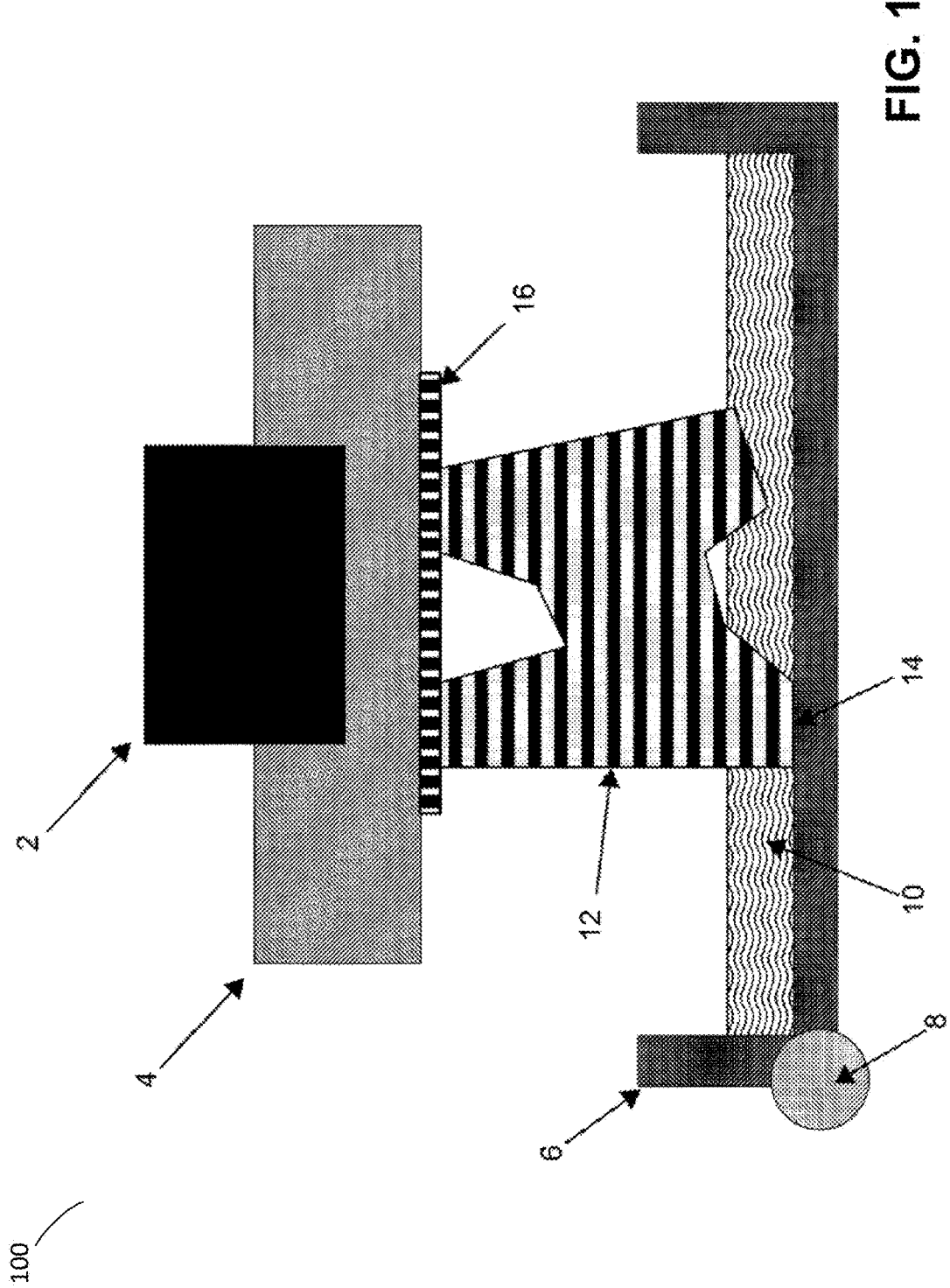
FIG. 1 illustrates an illustrative additive fabrication process in which a part is formed that includes a raft structure, according to some embodiments.

Systems and methods for additive fabrication that form structures to assist in post-processing of an associated fabricated part are provided. As discussed above, in additive fabrication a plurality of layers of material may be formed on a build platform. Typically, a first layer of the material is formed on a build surface as an initial step of the formation process. The first layer typically provides both stability for subsequent formation of additional layers and provides a layer through which the part being formed may be adhered to the build surface. The degree to which the first layer and the build surface adhere to one another may depend on multiple factors, such as the material used to form the layer and the geometries of the build platform and/or the first layer. In some cases, the first layer of the part being fabricated may have an area that is sufficiently small that the adhesive forces between the first layer and the build surface during fabrication may be insufficient to retain contact between the part and build surface, which may lead to the part separating partially or completely from the build surface. Assuming the part successfully adheres to the build surface throughout the fabrication process, it is removed from the build surface as a post-processing step subsequent to fabrication of the part being completed.

In addition to removal of a part from a build surface, post-processing may include further steps performed subsequent to fabrication of the part. In some use cases, material may have been formed to support overhanging or otherwise unsupported structures of the part, and this excess material may be removed (e.g., using a knife or other cutting tool). In some use cases, cleaning of a part may be performed after fabrication. For example, when using a photopolymer-based additive fabrication device it may be beneficial to immerse a newly formed part into a cleaning solution such as isopropyl alcohol to remove excess uncured or partially cured resin from surfaces of the newly formed part. When using a powder-based additive fabrication technology, post-processing may include the removal and/or potential recovery of powder media used to form the part that has not been fused or otherwise incorporated into the final part formed using said powder. In some use cases, the surface of a fabricated part may be altered or finished using techniques that etch or otherwise affect the surface characteristics of the part. For example, parts fabricated using a fused filament additive fabrication technology may be finished using a vapor polishing technique (e.g., using acetone vapor) which causes the surface of the part to be smoothed and appear glossy. In some use cases, a part may be immersed in water and/or an acid/alkaline solution (e.g., sodium hydroxide) to dissolve a portion of the part.

Performance of any post-processing steps, however, including but not limited to those discussed above, may risk damage to the fabricated part. In many cases, fabricated parts are fragile and/or include features that may be damaged or removed by certain post-processing steps. For example, a user holding a part to perform removal of a support structure or to perform cleaning of the part may exert sufficient force when holding the part that the force causes the part to be damaged. In addition, a post-processing step in which a part is removed from a build surface may cause damage to the part via the forces that are necessarily exerted on the part in order to remove it. In some extreme cases, the use of a scraping or cutting tool to remove a part from a build surface may result in injury to a user. For example, if the adhesive forces between a fabricated part an a build surface are sufficiently high, the user may have to exert considerable force in order to separate the part from the build surface, which increases the risk of injury.

The inventors have recognized and appreciated that one or more auxiliary structures may be formed with a fabricated part that may be shaped to assist a user in performing one or more post-processing steps of the part. Such post-processing steps may include, but are not limited to, those described above. The auxiliary structures may, in some embodiments, be formed so as to be easily removable from the part such that the structures may be utilized during post-processing steps then removed from the body of the part (i.e., a portion of the fabricated part other than the auxiliary structure(s) that represents the desired structure).

According to some embodiments, it may be beneficial to increase the stability and/or adhesion of a fabricated part to a build surface by forming a structure, known as a "raft," on the build surface (e.g., prior to forming the first layer of the body of the part). By removing the raft structure from the part after the fabrication process is completed, the additional stability and/or adhesion may be provided during fabrication without impacting the form of the fabricated object. Raft structures may increase adhesion between one or more layers of material and a build surface in multiple ways, such as by increasing the surface area in contact with the build surface.

According to some embodiments, a raft structure is formed that includes one or more "removal pockets" that aid a user in separating the raft structure from the build surface. As indicated above, while a raft structure may increase adhesion between a fabricated part and a build surface, increased adhesion may also increase the force needed to separate the fabricated part from the build surface. Pocket structures within the raft structure may be shaped to allow lifting and/or peeling forces to more easily cause separation of the raft structure from the build platform. For example, suitable pocket structures may be shaped to allow insertion of a removal tool, which may pry or otherwise separate the raft from the build surface using a lower force than would be necessary without the pocket structure. A suitable raft structure may include any number of removal pockets, which may include any number of different shaped pocket structures.

According to some embodiments, a raft structure may include any number of layers of material formed by an additive fabrication device, and a removal pocket may also be formed from any number of those layers. In some use cases, portion of the raft and/or removal pocket may be formed in layers in which portions of the body of the fabricated part are also formed. For example, if the raft structure includes a flat portion and a raised portion, the flat portion may be formed prior to forming any portion of the body of the part, but some or all of the raised portion may be formed in layers in which some or all of the body is also formed.

According to some embodiments, a representation of a raft structure including removal pockets may be generated by computationally combining a representation of a raft with a representation of a pocket structure. The representation of the raft structure may include any number of pocket structures as a result of the combining. For example, a polygonal representation of a pocket structure may be combined with a polygonal representation of a flat raft structure (e.g., via a Boolean algorithm), resulting in a polygonal representation of a raft structure having one or more removal pockets with a shape described by the polygonal representation of the pocket structure. A representation of a raft structure may be generated from any number of such combinations, which may include multiple representation of removal pockets (e.g., having different shapes).

According to some embodiments, a raft structure may include one or more void spaces, which are regions in which no material is formed. Suitable void spaces may be located between at least one portion of the raft structure and the build surface. For example, a void space may facilitate insertion of a tool into the void space and thereby allow for separation of the raft structure form the build surface using the tool. According to some embodiments, a raft structure may include one or more sacrificial structures. A sacrificial structure may be formed to strengthen or increase adhesion of a pocket structure while also tending to collapse or easily break or fracture under forces applied to or through the removal pocket during the removal process. In some embodiments, at least one removal pocket comprises such a sacrificial structure, such as within a suitable void space.

According to some embodiments, one or more removal pockets may be selected and/or placed automatically (e.g., using a suitable algorithm). The choice of pocket design structure(s) used in a raft structure, in addition to their dimension(s), orientation(s), number and/or placement(s) may be determined via any suitable technique or techniques. In some use cases, one or more of the above factors may be determined based at least in part on the geometry of the body of the part being fabricated, one or more characteristics of the build platform on which the part is fabricated, forces expected to be applied through points on the raft structure (e.g., calculated or heuristically determined), or combinations thereof. According to some embodiments, one or more removal pockets may be selected and/or placed within a raft structure based at least in part on manual input from a user. For example, a user interface that displays a representation of the raft structure may receive input (e.g., via mouse, keyboard, etc.) that dictates, at least in part, where one or more removal pockets are to be placed.

According to some embodiments, the design of any pockets, e.g., choice of pocket design structure(s) used in a raft structure, in addition to their dimension(s), orientation(s), number and/or placement(s), etc. may be based at least in part on the surface area of the associated raft structure. In cases where a raft structure contacts a build surface over a surface area that is less than a target surface area, for example, the number and/or size of pockets may be chosen so as not to reduce the surface area that is in contact below a certain threshold. Additionally, or alternatively, the design of any pockets may be chosen so as to minimally impact the surface area where a raft structure contacts a build surface, such as by reducing the effective mechanical strength of the pocket(s) to reflect the lower level of expected removal forces. In other cases where a raft structure contacts a build surface over a surface area that is greater than a target surface area, the design of any pockets may be chosen so as to aid in removal of the raft (e.g., by including a larger number of pockets). The design of any such pockets may be alternatively or additionally modified, including by increasing the strength of a pocket to reflect the higher level of expected removal forces.

As discussed above, some post-processing steps may result in damage to a fabricated part due to forces exerted on the part during the step(s) (e.g., due to holding, mounting, shaking, etc.). According to some embodiments, an auxiliary structure that provides a "grip" may be fabricated with the body of a part. The grip may allow for easier and more effective post-processing by allowing a user to hold the grip structure during one or more post-processing steps. Forces exerted by gripping or holding the fabricated part may thereby be applied solely or largely to the grip structure rather than the body of the part. In some use cases, the grip structure may be removed subsequent to performance of any post-processing steps.

A grip structure fabricated so as to be in contact with the body of a part being fabricated may have any suitable shape and orientation and may be attached to the body of the part at any suitable location. According to some embodiments, a grip structure includes a hook shape or includes another shape suitable for being suspended from another structure. For example, a grip structure may include a shape having a T-shaped cross-section suitable for being suspended from parallel rails.

According to some embodiments, a grip structure may be formed to include information, such as information about the fabricated part. In some use cases, the grips structure includes one or more information carrier features, such as digits, holes or other patterns chosen to convey information. Any suitable aspects of such information-carrier features, including aspects such as location, size, and/or depth of holes, may be used to encode information. In some use cases, the grip structure includes a registration mark.

According to some embodiments, a grip structure may be structured to be held during immersion of the body of the part in a solution. As discussed above, post-processing steps may include immersion in a solution to clean, further cure and/or to dissolve regions of the part. A grip structure may allow a user to perform the fluid immersion post-processing step while no region of the body of the part is touched or otherwise handled, by holding (e.g., by hand, using a tool) the grip of the part and performing the immersion.

According to some embodiments, the orientation and/or position of a grip structure may be chosen based on an anticipated orientation of the part during one or more post-processing steps performed while holding or otherwise handling or mounting the part via the grip structure. For example, a grip structure may be positioned and/or oriented on the body of a part so as to orient the body of the part in a particular direction when held or otherwise handled by the grip. Moreover, as discussed above, a part may be suspended by a grip structure during one or more post-processing steps. As a result, the orientation of the suspended part during the post-processing step may depend, at least in part, on the location of the grip structure, and thus the suspension point. In particular, the position and orientation of a freely suspended part may be substantially determined by an interaction between the suspension point and the center of mass of the part, while the position and orientation of a rigidly suspended part may depend primarily on the location and orientation of the connection between the grip structure and a support fixture. Accordingly, the orientation and/or position of the grip structure may be based at least in part on the anticipated orientation of the suspended part.

According to some embodiments, a grip structure may be oriented and/or positioned at a location based on the orientation of the part during the formation process. As one non-limiting example, a user and/or process may select an orientation of a part for various reasons, including to generate support structures. Following such an orientation, a grip structure may be added to the part based on the selected orientation, such as at a position maximally distant from the build platform given the selected orientation.

According to some embodiments, it may be advantageous to reorient and/or move a part during one or more post-processing steps. In the case of post processing by exposure to liquids, for example, it may be advantageous in some embodiments to immerse and remove a part on a particular schedule of exposures. Advantages from such motions may include agitation of liquid and appropriate exposure time of the part. Similarly, other post processing techniques, such as post processing with actinic radiation, may also benefit from reorienting and/or moving the part during one or more post-processing steps. Advantages from such motion may include ensuring optimal actinic radiation exposure to multiple surfaces of the part. In some embodiments, grip features of a part may be used to simplify such reorientations and/or motions. In particular, automated or semi-automated fixtures such as lifting arms may be attached to grip features irrespective of the underlying geometry of the part. In some embodiments, grip structures may be particularly designed for specific fixtures or devices to be used during the post processing. As discussed below in relation to FIG. 9, some embodiments of the present invention may add features such as slots, or other asymmetries, to advantageously allow for rotational forces to be more easily applied to the part such that the part may be more easily rotated during one or more post-processing steps.

According to some embodiments, a grip structure may be oriented and/or positioned so as to avoid areas of the part with high detail and/or prominent visual or functional significance, so as to reduce the amount of post-processing needed following the removal of the grip structure. According to some embodiments, a grip structure may be oriented and/or positioned to avoid weaker areas of the part, such as areas with thin walls or isolated extensions, to avoid internal stresses, distortions, or failure of the part during post processing.

According to some embodiments, aspects of a grip structure (e.g., shape, size, position and/or orientation) may be determined with a minimum of user input in order to increase the ease of use of an additive fabrication system and decrease the risk of user error. In some embodiments, the user may select desired locations, grip shape choices, and other details to be used in the addition of the grip structure to a part. In some embodiments, automated processes may identify, select, and/or propose locations, grip shape choices, and/or other details to be used in the addition of the grip structures to a part. In some embodiments, grip creation parameters, including the optimal placement of grip structures, may depend at least in part on expected post-processing steps to be used and the particular post-processing step for which optimization is desired.

According to some embodiments, a representation of a part may be generated by combining a representation of a grip structure with a representation of the body of a part. As one non-limiting example, such combination may be performed by generating and/or loading a geometrical model of the grip structure in any one of a number of appropriate formats, including voxel, NURBS surfaces, triangulated meshes, and/or other representations. The geometrical model of the grip structure may then be scaled or otherwise modified as appropriate for the size of the part, mass of the part, expected forces during post processing, expected strength of the grip, and/or as desired by the user. The geometrical model of the grip structure may then be combined with a geometrical model of the body of the part at the desired location by insertion or combination of the geometrical model of the grip into the geometrical model of the desired part. Such an insertion or combination may be accomplished in any suitable way including, but not limited to, Boolean union operations between the geometrical model of the part and the geometrical model of a grip structure based on voxel, mesh, and/or other representations of the respective model.

According to some embodiments, a grip structure may be optimized for immersion within a liquid. Such immersions may include one or more timed periods in or out of the liquid, replacement and/or circulation of the liquid, and/or agitation of the liquid and/or the part. In some use cases, movement of the part itself, such as relatively rapid insertion and removal of the part from the liquid, may provide substantial mixing and circulation within the liquid. In some embodiments, parameters regarding the grip structures (e.g., shape, size, position and/or orientation) may be optimized to account for fluid flow properties of the immersion liquid. As one example, a grip structure may be located so as to orient the part to avoid the creation of trapped volumes during immersion in a liquid and/or during subsequent removal. Such trapped volumes may, for example, take the form of air unable to be displaced from internal and/or external regions of the part by post-processing liquid. Such trapped volumes may additionally or alternatively take the form of post-processing liquid unable to escape from internal and/or external regions of the part. In some use cases, the degree to which trapped volumes on the internal and/or external surfaces of a part may be reduced or eliminated by choosing a suitable the orientation of the part when suspended in the liquid. Such orientations may be determined based on user input and/or appropriate heuristic analysis of the geometry of the part. As one example, various candidate orientations may be generated and the flow of fluids simulated in each candidate orientation using any suitable fluid simulation technique(s). Based on such simulations, an orientation may be chosen which exhibits desired fluid flow properties. Such a process may also be further integrated by testing variations on a preferred orientation to find a locally optimal orientation.

According to some embodiments, post processing of a part may include placing the part within a chamber or within an enclosed environment. Such chambers are typically of a fixed size which may or may not correspond to the maximum size of the build environment of a related additive fabrication device. As such, in some use cases, a part fabricated using the additive fabrication device may only fit within such a post-processing chamber in particular orientations. Accordingly, a grip structure may be located so as to orient the output of the additive fabrication device within the bounds of the post-processing chamber. As one example, the location of a grip structure may be chosen so as to orient the part in a substantially horizontal direction so as to fit within a post-processing chamber wherein the longest extent of the chamber is substantially horizontal.

According to some embodiments, post processing of a part may include exposing the part to actinic radiation. Actinic radiation may be projected onto the part from a number of sources and thus from a number of directions. As such, certain portions of a part may receive more or less incident actinic radiation depending upon the orientation of the part and the positions of the radiation sources during the exposure. In some embodiments, a grip structure may be located so as to orient the part to receive an optimal exposure to actinic radiation. For example, an optimal exposure may be a maximization of total actinic radiation energy incident on the part, or may be a maximization of total actinic radiation energy on preferred portions of the part, such as on one or more identified structures and/or on one or more detailed features of the part.

Following below are more detailed descriptions of various concepts related to, and embodiments of, systems and methods for additive fabrication that form structures to assist in post-processing of an associated fabricated part. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although the embodiments herein are primarily disclosed with respect to the Form 1 3D Printer sold by Formlabs, Inc., the Assignee of the present application, and with respect to stereolithography, the techniques described herein may be equally applicable to other systems. In some embodiments, structures fabricated via one or more additive fabrication techniques as described herein may be formed from, or may comprise, a plurality of layers. For example, layer-based additive fabrication techniques may fabricate an object by forming a series of layers, which may be detectable through observation of the object, and such layers may be any size, including any thickness between 10 microns and 500 microns. In some use cases, a layer-based additive fabrication technique may fabricate an object that includes layers of different thickness.

Although particular systems and methods for additive fabrication that form structures to assist in post-processing of an associated fabricated part have been described and shown herein, it is envisioned that the functionality of the various methods, systems, apparatus, objects, and computer readable media disclosed herein may be applied to any now known or hereafter devised additive fabrication technique wherein it is desired to reduce the risk of damage to a fabricated part during any number of steps performed after fabrication.

As discussed above, the inventors have recognized and appreciated that one or more auxiliary structures may be formed with a fabricated part that may be shaped to assist a user in performing one or more post-processing steps of the part. As further discussed above, a suitable auxiliary structure may include a raft structure. FIG. 1 illustrates an illustrative additive fabrication process in which a part is formed that includes a raft structure. Exemplary stereolithographic printer 100 forms a part 12 in a downward facing direction on build platform 4. In the example of FIG. 1, build platform 4 opposes the floor of container 6, which is filled with a photopolymer resin 10. A part 12 may be formed layerwise, with an initial layer attached to the build platform 4.

The floor of container 6 may be transparent to actinic radiation, which may be targeted at portions of a layer of liquid photocurable resin resting on the floor of the container. Exposure to actinic radiation cures a thin layer of the liquid resin, which causes it to harden to form layer 14. The layer 14 is at least partially in contact with both a previously formed layer and the surface of the container 6 when it is formed. The top side of a cured resin layer typically bonds to either the bottom surface of the build platform 4 or, in the case of layer 14, with the previously cured resin layer in addition to the transparent floor of the container.

In the example of FIG. 1, part 12 includes raft structure 16, which may comprise one or more layers of material formed by stereolithographic printer 100. As discussed above, the raft may increase adhesion between the part and a build surface at least in part by providing a greater surface area in contact between the part and build surface. As shown in FIG. 1, raft structure 16 contacts a greater area of build platform 4 than part 12 would contact in the absence of the raft structure (i.e., if part 12 were directly formed on build platform 4). A suitable raft structure may extend across a build platform in any suitable way, and the cross section of raft structure 16 shown in FIG. 1 may, for example, represent a cross section of a circular raft, rectangular raft or any other suitable shape. In some use cases, such as those discussed above, however, part 12 may be difficult to remove from the build platform, at least in part due to the increased adhesion between the part and the build platform.

Figure 2:
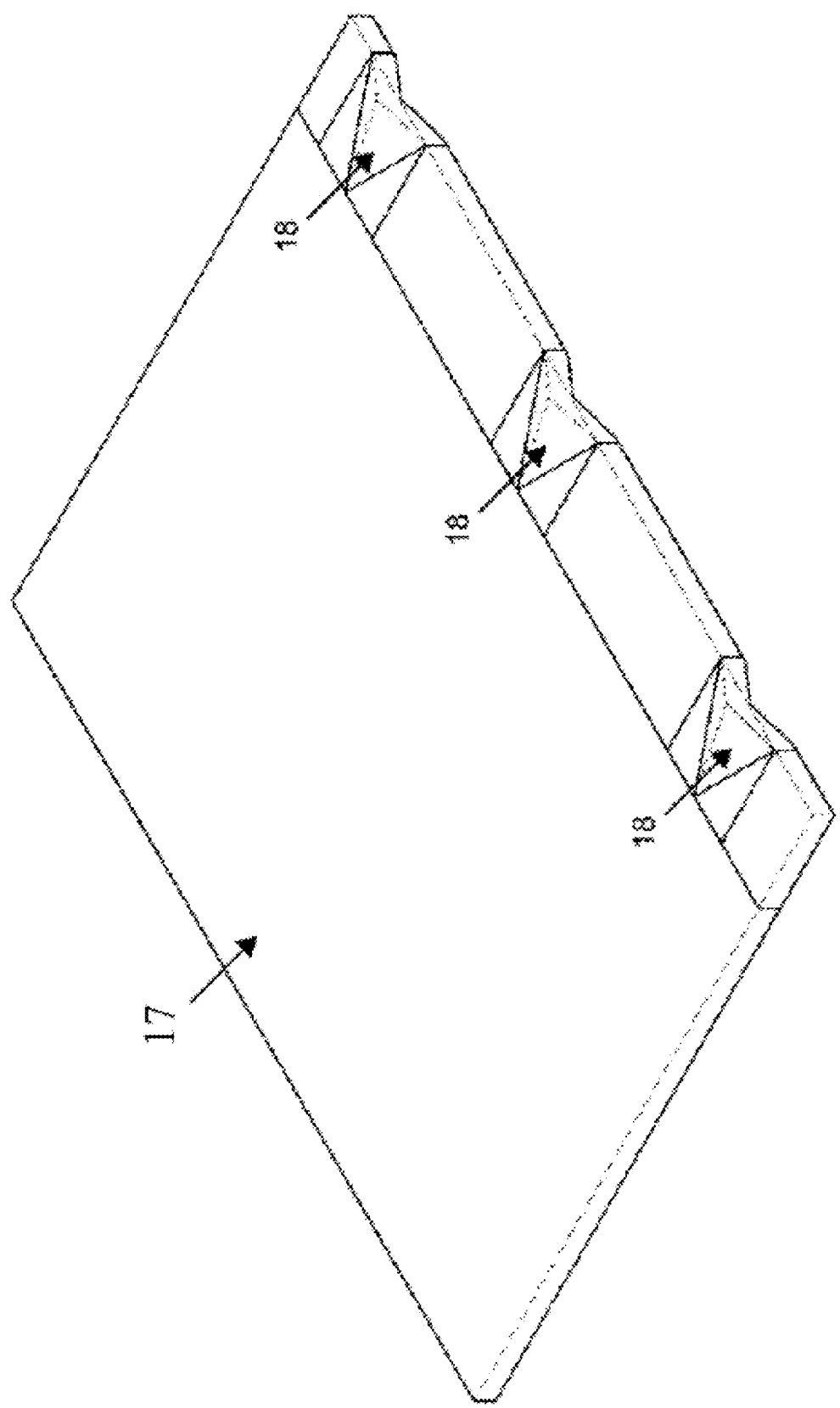
FIG. 2 depicts a raft structure having removal pockets which, according to some embodiments.

FIG. 2 depicts a raft structure having removal pockets which, as discussed above, may provide for easier, safer and/or more efficient removal of a part from a build platform. Raft structure 17 shown in FIG. 2 may represent all or a portion of a raft structure formed on a build platform as part of initial layers of material formed during fabrication of a part. The body of a part that may be formed on the raft structure 17 is not shown in FIG. 2 for purposes of clarity.

In the example of FIG. 2, the raft structure 17 includes removal pockets 18 located along one edge of the structure in any manner of configurations, e.g., evenly spaced. Such pockets may be designed to allow for a user to remove the raft structure from a build surface by exerting lifting and/or peeling forces. For example, the pockets 18 may form void regions between the raft 17 and a build platform that facilitate insertion of a removal tool.

While, in the example of FIG. 2, pockets 18 are included at only one edge of raft structure 17, in general pockets may be located at any number of locations along any edge or edges or the raft structure. In some embodiments, the number and/or location of the pockets may depend at least in part on the geometry of the raft structure. In some embodiments, multiple pockets may be located continuously (e.g., evenly spaced) around the perimeter of a raft structure, thus allowed for insertion of a removal tool at various locations. A user may then choose a pocket most convenient for removal depending on the specific circumstances (e.g., which pockets the user has access to).

According to some embodiments, one or more pockets are positioned during design of a raft structure in the following way: the edge of a raft structure without pockets may be defined as a two-dimensional, closed polygon and a representation of the raft structure may be stored in a suitable computer readable medium. Then, the raft representation is computationally modified by combining a representation (e.g., two-dimensional polygon cross-section) of a pocket structure with the raft representation. For example, the computational combination may comprise using a polygon Boolean algorithm. Such algorithms may perform Boolean operations on polygons to form unions, intersections, disjunctions, etc. of the polygons, e.g., by manipulating bitmaps or using a sweep line algorithm.

In general, a removal pocket structure may be any structure having an opening at an exterior surface of a raft structure, which may be along a bottom edge of the raft structure (e.g., so as to be adjacent to a build surface) or may be situated within a face of the raft structure (e.g., so as to have material formed both above and below the pocket structure). It may be advantageous for a pocket structure to have a tapered shape such that the width of an opening decreases with increasing distance from the exterior surface of the raft structure, though it may also have a shape that does not taper, or even widens with increasing distance from the exterior surface of the raft structure. A pocket structure may be oriented parallel to a build surface, or may be oriented towards or away from a build surface such that a tool inserted into the pocket may be naturally directed towards or away from the build surface. In some use cases, the orientation of the pocket structure may be chosen to facilitate leverage provided to a removal tool by the shape of the pocket. According to some embodiments, a raft structure may include any combination of removal pocket structure variations described herein.

According to some embodiments, following modification of a representation of a raft structure to include one or more removal pockets, one or more checks may be performed to determine whether the modification resulted in a valid addition of a pocket structure to the raft according to one or more criteria that may depend on the overall design of the system. In some embodiments, the following criteria may be evaluated: whether the proposed pocket structure is contained completely within the raft polygon representation; whether the proposed pocket structure causes the raft structure to be divided, or split, into distinct polygons; and/or whether any new polygon corners formed by the addition of the pocket fall within a particular range of angles (e.g., chosen so as to maintain the general contours of the raft structure). If any of the criteria being evaluated are found to be unsatisfactory, the raft structure may be further evaluated to determine alternate locations for the pocket structure(s) (e.g., by manual manipulation of the structure and/or by automatic relocation of one or more pocket structures).

Figure 3A:
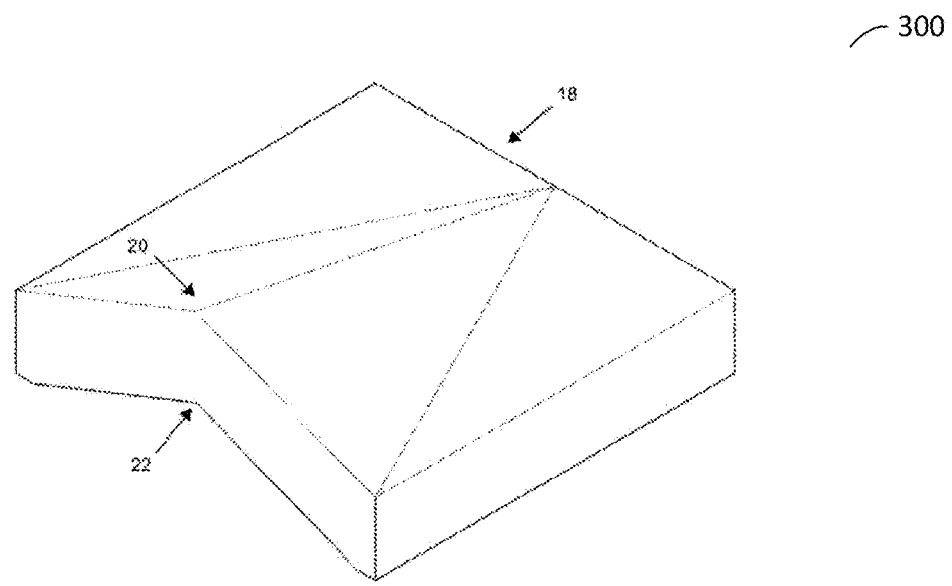
FIGS. 3A-C depict an illustrative pocket structure, according to some embodiments.
Figure 3B:
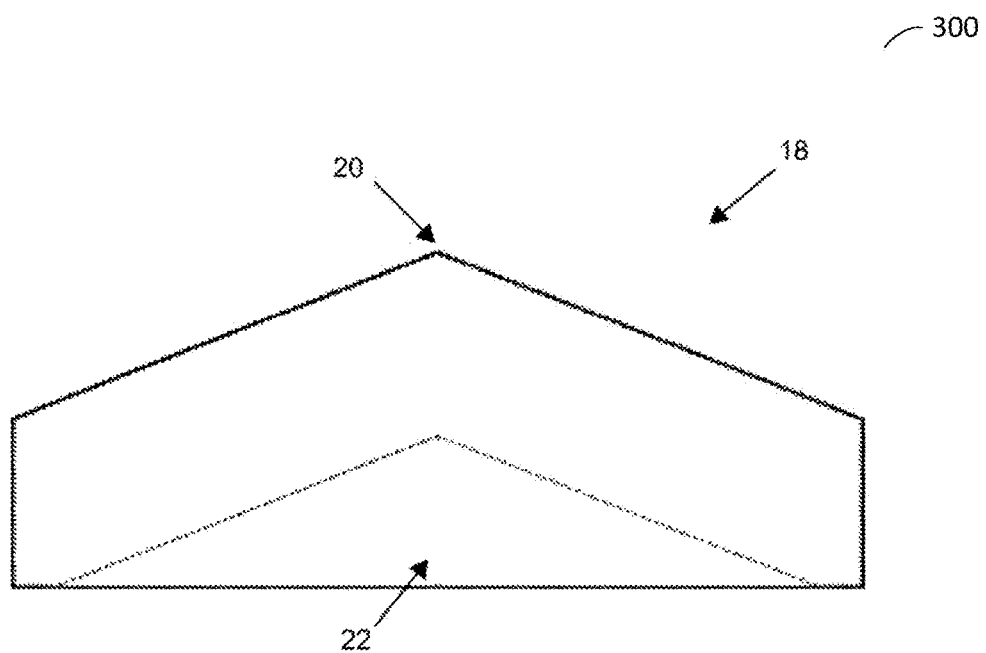
Figure 3C:
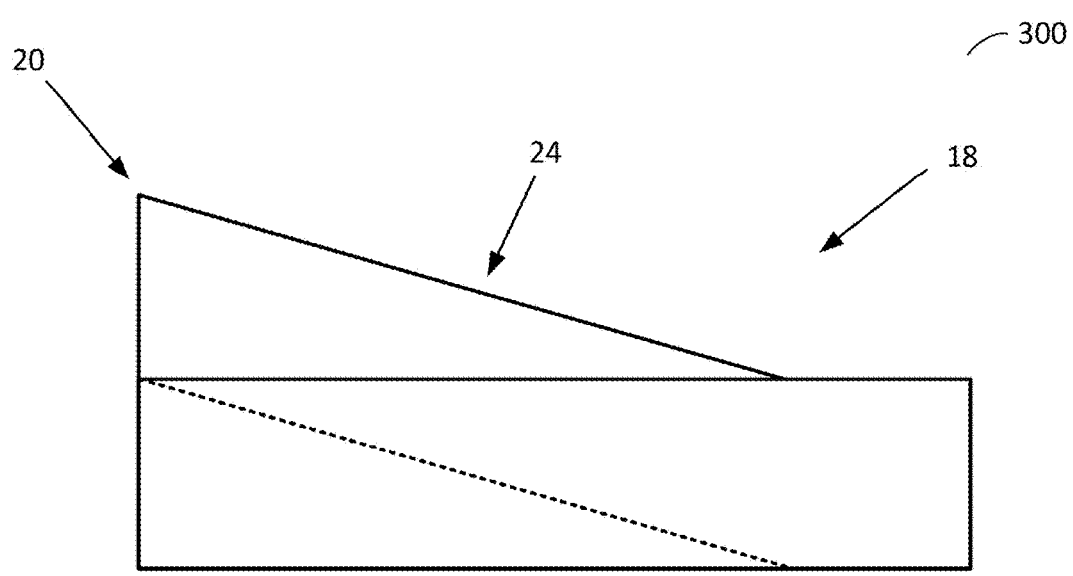

FIGS. 3A-C depict an illustrative pocket structure in isometric, front and side views, respectively, according to some embodiments. Raft structure 300 may represent all or a portion of a raft structure formed on a build platform as part of initial layers of material formed during fabrication of a part. The body of a part that may be formed on the raft structure 300 is not shown in FIGS. 3A-C for purposes of clarity.

As shown in FIGS. 3A-C, a pocket structure 18 may introduce a void space 22 underneath the raft structure 300. When raft structure 300 is formed on a build surface, the void space 22 will be located between the build surface and the pocket 18. In particular, the void space 22 in the example of FIGS. 3A-C includes a raised portion 20 that is situated above the void space 22.

According to some embodiments, the raised portion 20 may be formed by deflecting or raising a portion of the raft structure such that the pocket 18 is formed. As discussed above, a user may utilize a pocket structure, such as pocket 18, to more easily remove raft structure 300 from a build surface. For example, using a slotted screwdriver or similar prying tool, a user may insert the end of the tool into void space 22 formed by pocket 18, such that the tool extends below the raised surface portion 20 of the raft structure 300. According to some embodiments, the structure of pocket 18 may guide the user in a preferential placement of such a tool by having internal structure that directs motion of a tool toward the preferred placement. For example, the void space 22 and raised portion 20 of the pocket may be formed so as to decrease in height with increased depth from the edge of raft 300.

According to some embodiments, the slope of a pocket 18 may be chosen to control the angle of approach of a removal tool or other device inserted into the pocket to perform removal of the raft structure 300 from a build surface. For example, a tool fully inserted into the pocket 18 may tend to rest against the build platform at the bottom and against the sloping structure 24 (shown in FIG. 3C) at the top. Accordingly, the tool may tend to form a similar angle against the build platform as the angle of the slope structure 24.

When a user removes raft 300 from a build surface, a tool can be pressed into the pocket 18. The force of that application may contain multiple components, including a "lifting" separating force normal to the build platform and/or a "shearing" separating force parallel to the build platform. The relative magnitude of these forces may be influenced and guided, at least in part, by the specified angle of the slope of structure 24 included in pocket 18. In some embodiments, pocket structure 18 may be formed such that the void space 22 extends approximately 1.8 mm in height at its peak above the base level of the raft structure 300 along the perimeter of the raft structure, is approximately 9 mm wide, and runs for 9 mm into the raft structure. In some embodiments, the raised portion 20 of the raft extends for approximately 2 mm above the peak of the void space.

FIG. 4 depicts an alternate pocket structure of a raft, according to some embodiments. Raft structure 26 may represent all or a portion of a raft structure formed on a build platform as part of initial layers of material formed during fabrication of a part. The body of a part that may be formed on the raft structure 26 is not shown in FIG. 4 for purposes of clarity.

FIG. 4 illustrates an raft structure in which a void space may be formed without deflecting or raising a portion of a raft, by forming void spaces 28. The shape of void spaces 28 may be particularly suitable for certain removal tools. For example, a tool with a four-tined end may be particularly appropriate to use to apply force into the pocket structures shown in FIG. 4.

According to some embodiments, a raft structure such as raft structure 26 shown in FIG. 4 and/or raft structure 300 shown in FIGS. 3A-C may include void spaces that comprise one or more sacrificial structures. As discussed above, such structures may be introduced into the void space in order to strengthen and/or increase adhesions of the pocket to a build surface, while also tending to collapse under the forces applied to or through the pocket during removal of the raft structure from the build surface.

Figure 5A:
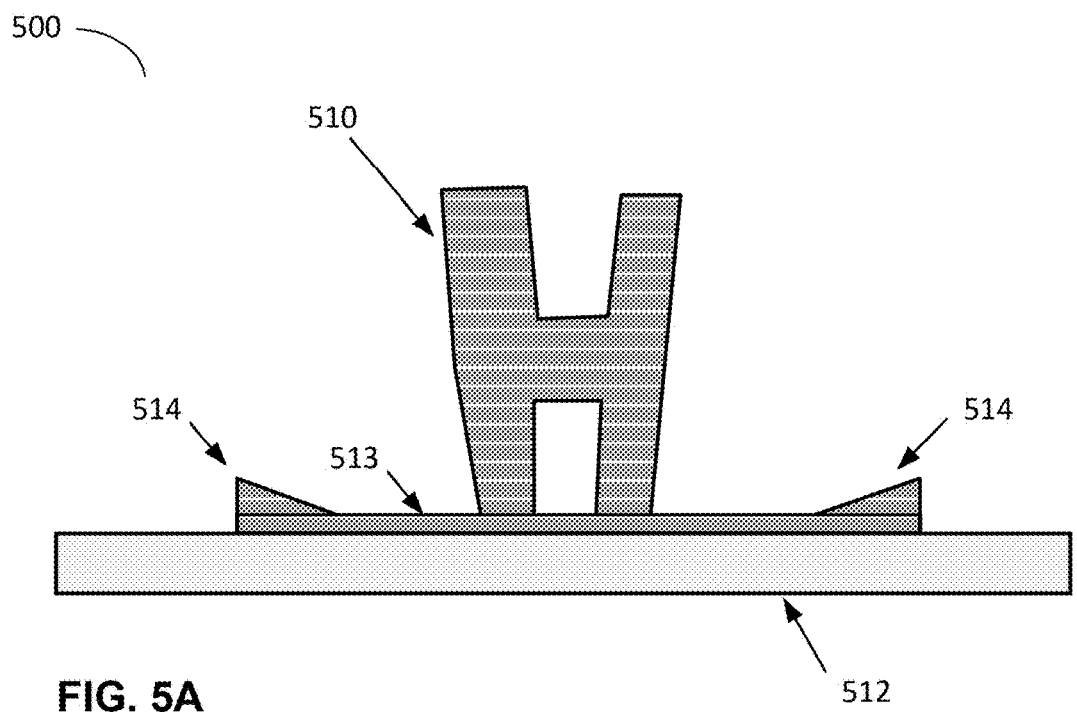
FIGS. 5A-B depict parts formed on a build structure including raft structures having removal pockets, according to some embodiments.
Figure 5B:
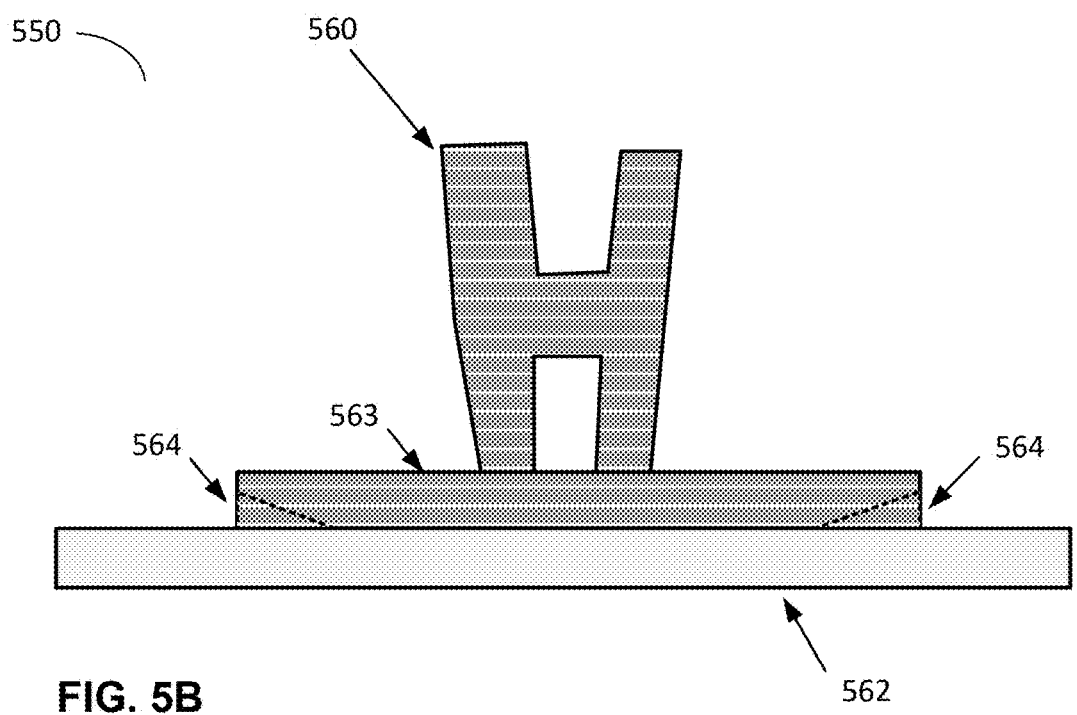

FIGS. 5A-B depict parts formed on a build structure including raft structures having removal pockets, according to some embodiments. Additive fabrication device 500 shown in FIG. 5A includes a part 510 formed on build platform 512, where part 510 includes a raft structure 513 having removal pockets 514. As shown in the example of FIG. 5A, the removal pockets extend upwards such that initial layers of the body of part 510 (shaped like a letter 'H' in the figure) are formed at the same height as regions of the removal pockets. In some use cases, a portion of the removal pocket may be formed in a layer that also includes portions of the body of the part (e.g., by forming material on top of previously formed layers at a single height). In the example of FIG. 5A, raft structure 513 may a structure commensurate with, for example, raft 300 shown in FIGS. 3A-C.

Additive fabrication device 550 shown in FIG. 5B includes a part 560 formed on build platform 562, where part 560 includes a raft structure 563 having removal pockets 564 (shown in hidden profile in the figure). In the example of FIG. 5B, raft structure 563 may a structure commensurate with, for example, raft 26 shown in FIG. 4. As shown in the example of FIG. 5B, the raft structure 563 has a completely flat upper surface such that the raft structure may be completely formed prior to formation of any layers of the body of the part 560 (shaped like a letter 'H' in the figure).

Figure 6:
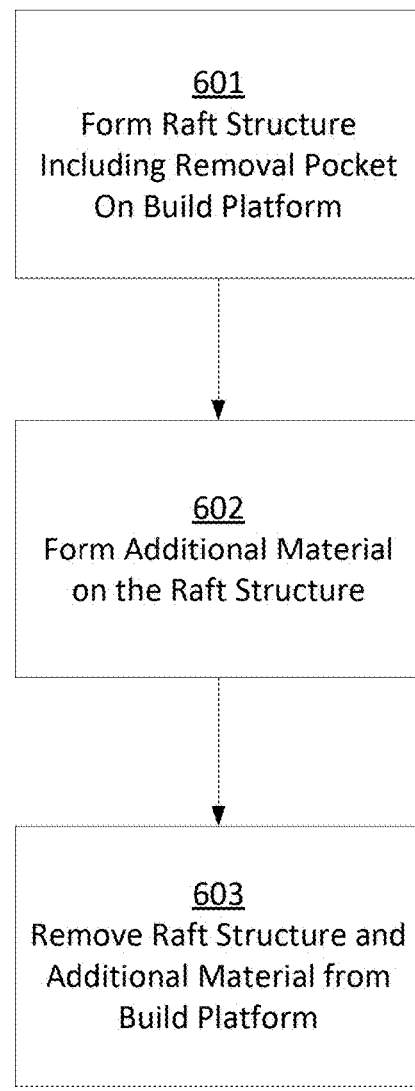
FIG. 6 depicts a method of forming a raft structure including a removal pocket, according to some embodiments.

FIG. 6 depicts a method of forming a raft structure including a removal pocket, according to some embodiments. Method 600 may be performed by any suitable additive fabrication device, including but not limited to additive fabrication device 100 shown in FIG. 1.

In act 601, a raft structure is formed on a build platform. The raft structure may include any number of layers of material, and may include any number of removal pocket structures. The uppermost layers of the raft structure may include portions of the removal pocket(s), portions or the raft structure other than the removal pocket(s), or both.

In act 602, additional material is formed in contact with the raft structure. The additional material may comprise any number of layers of material, and may be the same or different material than was used to form the raft structure in act 601. The additional material may, for example, represent an intended end result of the fabrication process. That is, subsequent to act 602, the raft structure may be removed from the additional material formed in act 602, substantially leaving only the additional material, which may represent the intended structure being produced. It may be appreciated that the raft formed in act 601 and the additional material formed in act 602 may, but need not be, formed in distinct layers of material. For example, the uppermost portions of the raft structure (i.e., those formed lastly in act 601) may be formed in the same layer that one or more layers of the additional material is formed in act 602. Such a case might arise where the raft structure has a lower height in a central portion and a higher height around its perimeter such that the additional material may be formed on the central portion at the same time as the perimeter of the raft structure is formed.

In act 603, the raft structure and additional material are removed from the build platform. As discussed above, removal of a part having one or more removal pockets in a raft structure may be performed by inserting a suitable tool into the removal pockets, or via any other suitable means.

Figure 7B:
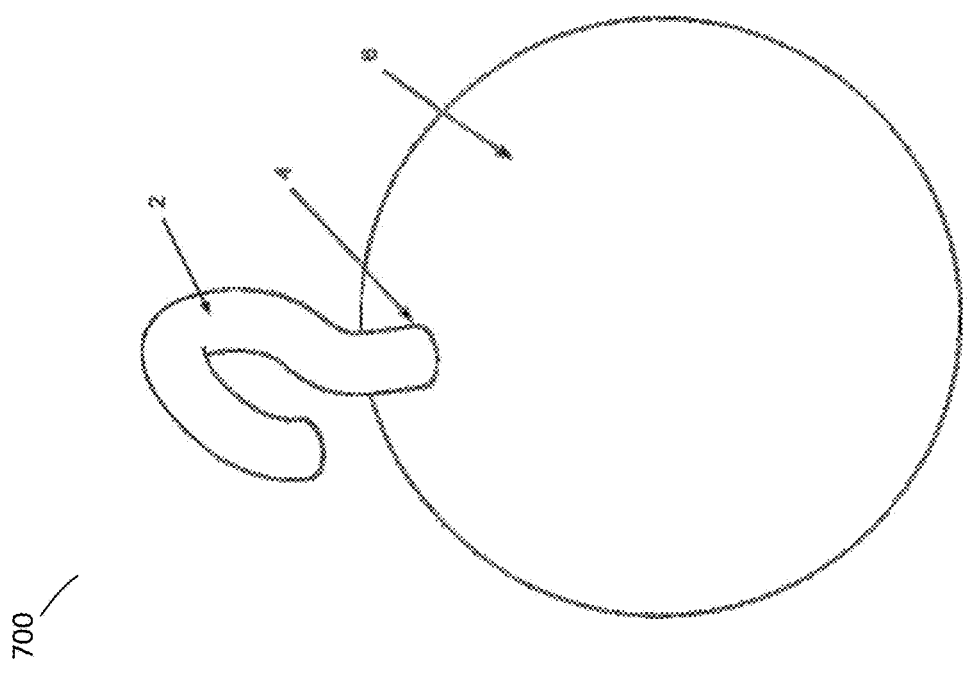
FIGS. 7A-B depict an illustrative grip structure attached to a body of a part having a spherical shape, according to some embodiments.
Figure 7A:
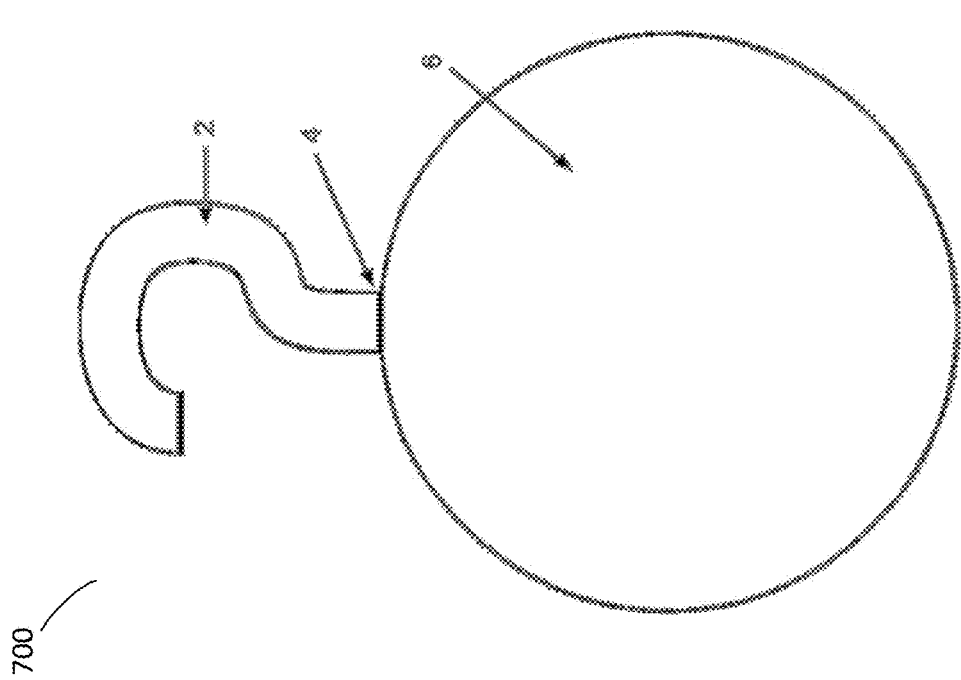

FIGS. 7A-B depict front and isometric side views, respectively, of an illustrative grip structure attached to a body of a part having a spherical shape, according to some embodiments. As shown in FIG. 7A, part 700 includes a grip structure 2 and body 6 such that the grip 2 is suitable for use in supporting the body 6. In the example of FIGS. 7A-B, the intended end result of the fabrication process is a sphere, and the grip 2 is formed attached to the body 6 which represents the intended end result. Once post processing utilizing the grip 2 has been completed, the grip may be removed to leave body 6, the intended end result of the fabrication process. As shown in FIGS. 7A-B, one example of a grip structure is a bent shape commonly known as a "hook."

Figure 8A:
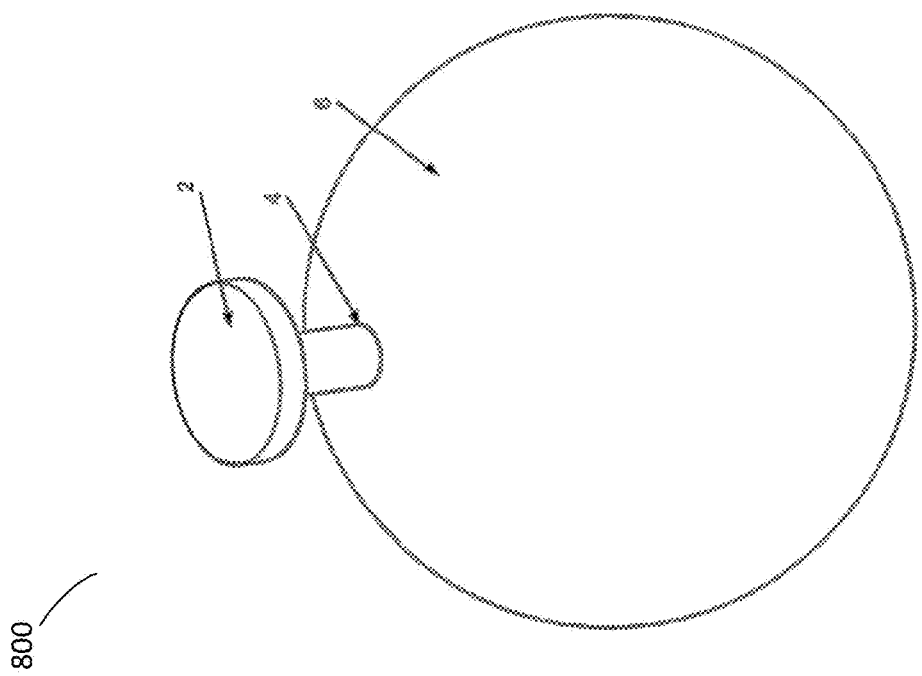
FIGS. 8A-B depict another illustrative grip structure formed for insertion into a channel, according to some embodiments.
Figure 8B:
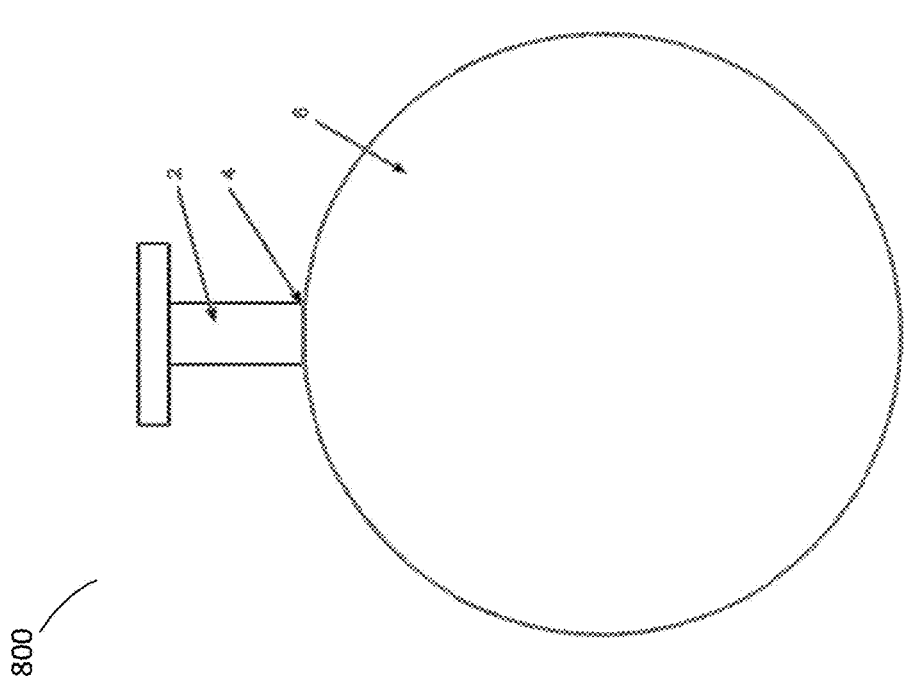

FIGS. 8A-B depict front and isometric side views, respectively, of another illustrative grip structure 2 formed for insertion into a channel shaped to receive such a grip structure within a supporting frame (e.g., a frame comprising parallel rails such that the top of grip 2 sits on the rails while the central portion of the grip is between the rails). Part 800 includes a grip structure 2 and body 6 such that the grip 2 is suitable for use in supporting the body 6. Grip structure 2 may be added to the body 6 such that an interface 4 is formed between the part 6 and the grip structure 2 that is both adequate for the support of the part 6 during one or more post-processing steps and sufficiently easy to remove from the part 6 following and/or as part of the completion of such post-processing steps. Such an interface 4 between the grip structure 2 and part 6 may be formed using one or more techniques for the temporary attachment of removable support structures. Alternatively, grip structures and/or the interface may be formed using various techniques known in the art for support structures from a second material that may be preferentially and/or selectively removed from a part formed of a first material.

Figure 9:
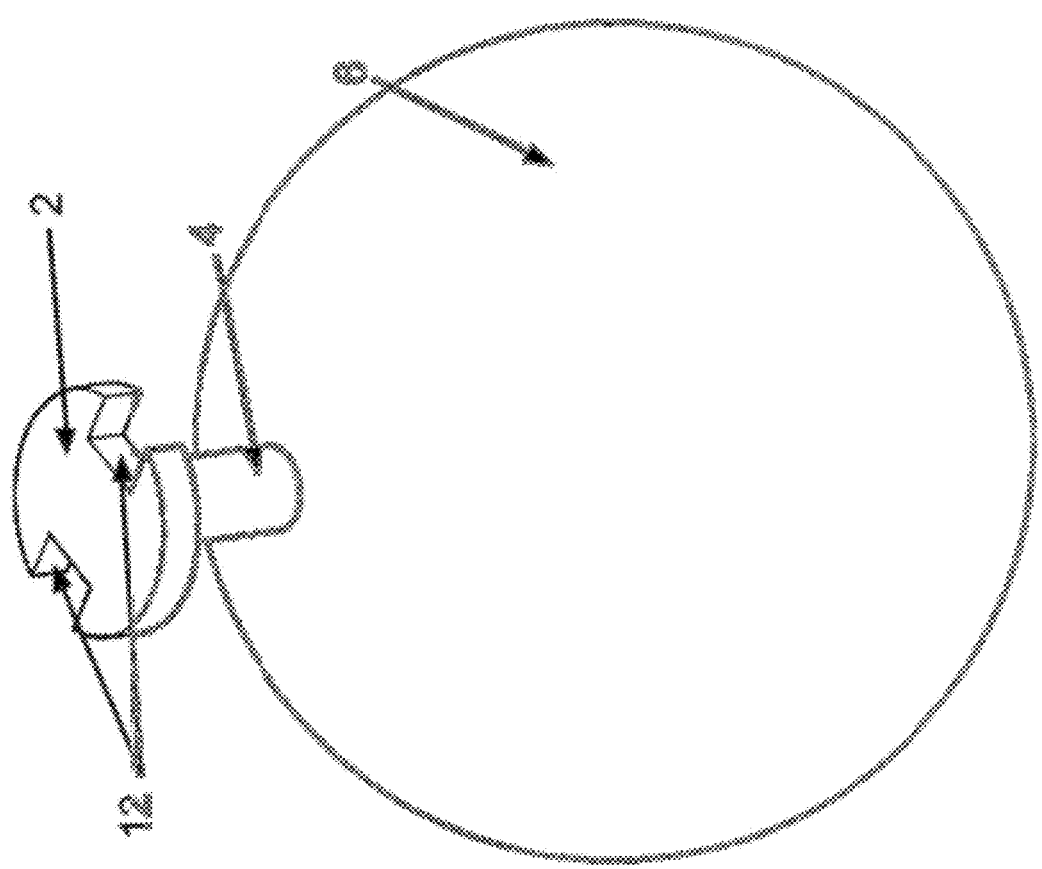
FIG. 9 depicts an illustrative grip structure that includes features to facilitate rotational movement around the grip structure, according to some embodiments.

FIG. 9 depicts an illustrative grip structure that includes features to facilitate rotational movement around the grip structure, according to some embodiments. Part 900 includes grip structure 2 formed in contact with body 6. The grip structure includes notches 12 that may facilitate rotational movement of the part around the axis of the grip (e.g., the axis that passes through the center of grip 2 and through the center of the spherical body 6).

Figure 10:
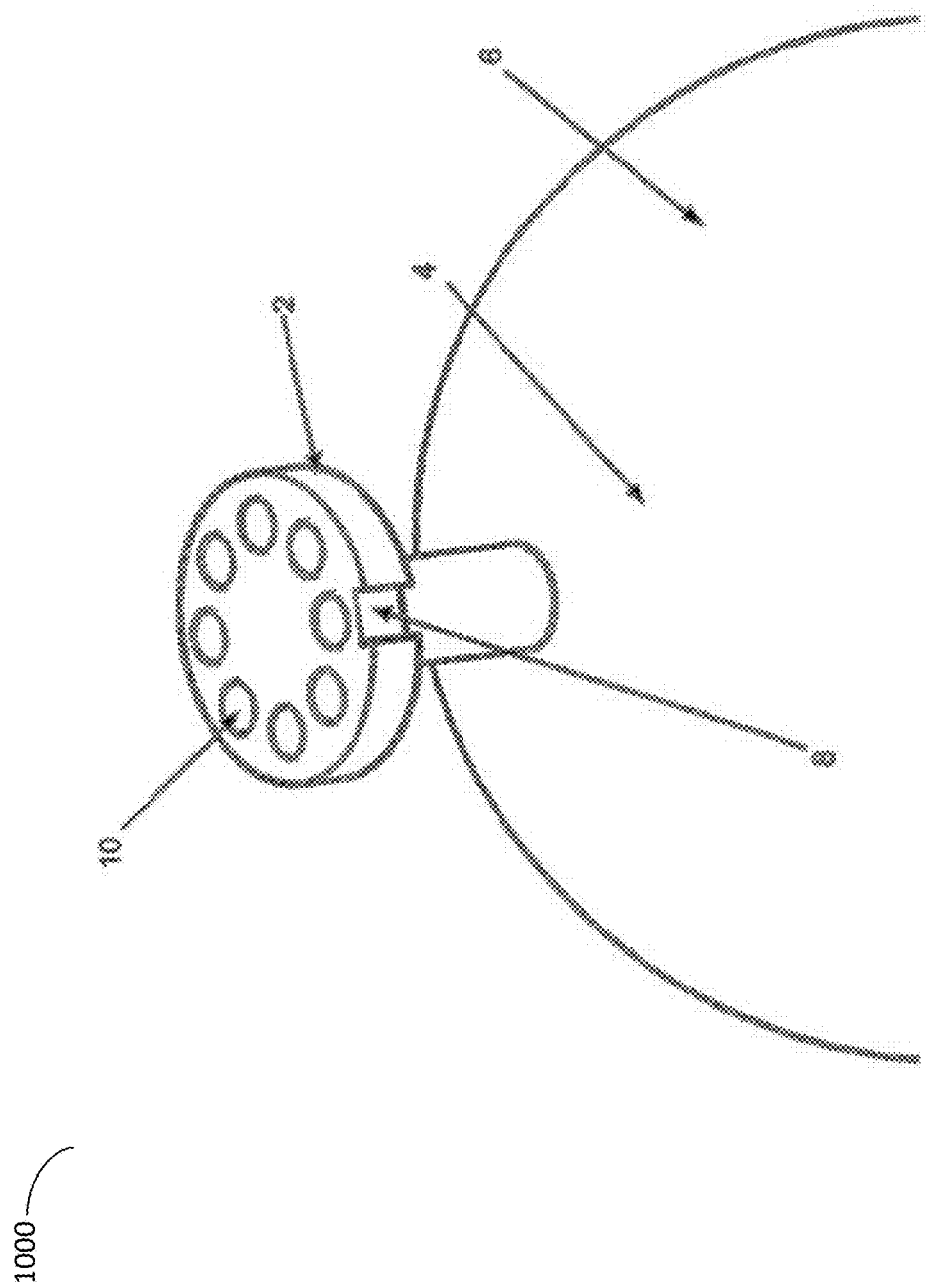
FIG. 10 depicts an illustrative grip structure that includes information-carrier features and a registration mark, according to some embodiments.

FIG. 10 depicts an illustrative grip structure that includes information-carrier features and a registration mark, according to some embodiments. As depicted in FIG. 10, eight information-carrier features 10 are located radially on a top surface of the grip structure 2. In the example of FIG. 10, each information-carrier feature 10 may be in the form of a hole or deep indentation into the grip structure 2 and/or may be in the form of a surface substantially planar with the top surface of the grip structure 2. According to the presentation, the configuration of such information-carrier features, including aspects such as location, size, and/or depth of holes, may be used to encode information.

As one non-limiting example, each information-carrier feature may or may not comprise a hole. Information-carrier features that do comprise holes may be interpreted as the binary digit '1', while information-carrier features that do not comprise holes may be interpreted as the binary digit '0.' In this way, up to 256 possible values may be encoded using eight such information-carrier features, which may utilize registration mark 8 to indicate the beginning of such a sequence and ensure that such digits are read in the intended order.

Alternatively, or additionally, the depth, dimensions, and/or location of an information-carrier feature may be altered in order to encode base n digits, wherein n represents the number of valid distinct configurations for a given information-carrier feature. Values encoded using information features described above may be read by other systems, and/or end users, in any suitable way. In some embodiments, visual recognition systems may be used to determine the configuration of information-carrier features. In other embodiments, such as the example depicted in FIG. 10, information-carrier features may be physically probed to determine their presence, size, location, and/or other configuration. Values encoded using an information-carrier feature may then be used by later post-processing systems to identify a given part, set process parameters based directly on the values encoded, and/or adjust existing process parameters as a function of the values encoded.

Figure 11:
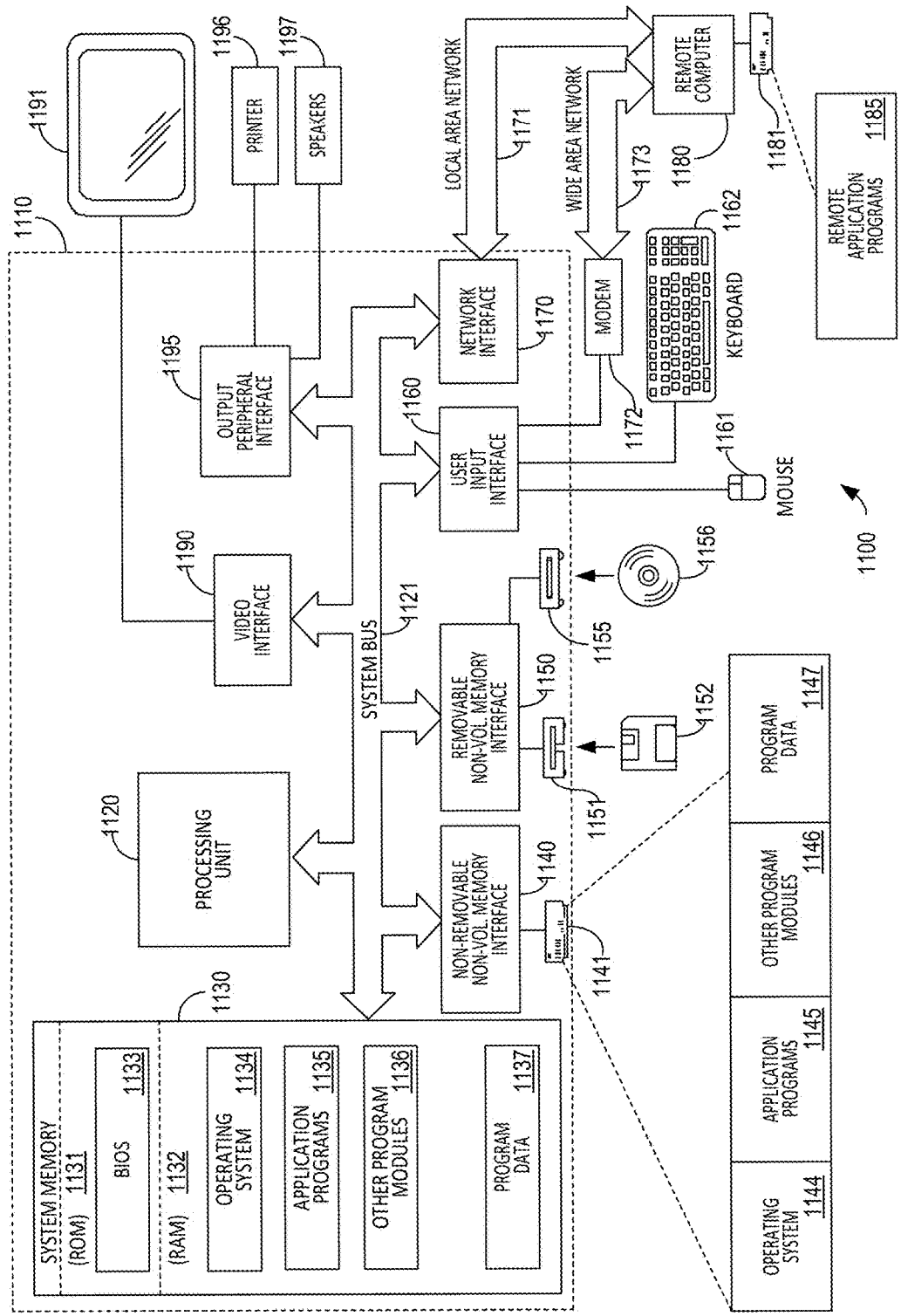
FIG. 11 illustrates an example of a suitable computing system environment on which aspects of the invention may be implemented.

FIG. 11 illustrates an example of a suitable computing system environment 1100 on which aspects of the invention may be implemented. For example, the computing system environment 1100 may be used to instruct one or more force generators (e.g., actuators) to apply a force to one or more regions of a container, to move a build platform, to move a wiper, or any combinations thereof. Such a computing environment may represent a home computer, a tablet, a mobile device, a server and/or any another computing device.

The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment 1100.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing aspects of the invention includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through an non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through a output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG.

11 illustrates remote application programs 1185 as residing on memory device 1181. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to activate one or more actuators to perform motions such as those described herein, such as motion of one or more regions of a container and/or of a build platform. Examples of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Various inventive concepts may be embodied as one or more methods, of which examples have been provided. For example, systems and methods for additive fabrication that form structures to assist in post-processing of an associated fabricated part have been provided herein. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

While auxiliary structures having raft and grip structures are described herein, other auxiliary structures may be used in addition or alternatively to these structures. For example, auxiliary structures may include tabs, handles or other structures to aid in removal of a part from a build surface.

In addition, any number and type of auxiliary structures may be formed in a part using techniques described herein, as the invention is not limited in this aspect. For example, a raft structure and one or more grips may be formed in a part. Further, the auxiliary structures formed may be of any size, thickness, layer density, material, etc. which may be different from other regions of the same part. For example, multi-material additive fabrication devices may produce auxiliary structures having different densities than the body of the part.

In some use cases, it may be advantageous to modify post processing steps for a given part based on build style, material parameters, or other aspects that may be particular to the part or particular additive manufacturing process used to form said part. Further, it may be particularly advantageous for such modifications to be handled in at least a semi-automated fashion, e.g., without substantial user involvement. As such, automated processes used in a finishing process may benefit from exchanging information from systems and apparatuses used in the printing process to systems and apparatuses used in the finishing process. Such information may be exchanged in various techniques, such as networked communications, digital storage, and/or manual entry. One aspect of the present invention allows for a wide variety of information associated with a part to be exchanged between fabrication and post processing systems by altering portions of the geometry added to the part as grip structures, or structures potentially added for the purpose of information exchange only.

The methods and techniques described herein may be implemented in any suitably programmed general-purpose computer, a special-purpose computer device (e.g., a digital signal processor, programmable gate array, application-specific integrated circuit, etc.), or generally any suitable combination of hardware and/or software. The computer may be integrated into the additive fabrication device or an associated printer controller, or provided separately in communication with the printer and/or controller. For example, in some embodiments, a computer including at least a processor and system memory (e.g., RAM), and typically also one or more non-volatile storage devices and media (such as, e.g., a hard drive, optical storage medium, or USB key), user interface devices (such as, e.g., a display screen, keyboard, and mouse), and a network interface, may store, in the memory, process-executable instructions implementing design of any suitable auxiliary structure (including, e.g., instructions for computationally modifying a representation of a raft structure and/or validating a modified design based on certain criteria) and/or directing an additive fabrication device to fabricate a designed part including one or more auxiliary structures.

Programming instructions that, when executed, perform any method or technique described herein may be in any suitable language (including high-level languages such as C++, C, Fortran, Python, BASIC, Pascal, etc. or assembly or other low-level languages), and may be grouped and organized into various modules. The computer may be connected, via a wired or wireless network (e.g., Ethernet, WLAN, or the Internet) to the additive fabrication device (and/or its controller), and the device may be operated based on a computational representation (e.g., data descriptive) of a part including one or more auxiliary structures.

Data describing a three-dimensional object suitable for fabrication using an additive fabrication device may be described using any suitable format, including any data format that defines a three-dimensional geometry (e.g., by defining positions of vertices, normals and/or faces). A non-limiting list of suitable formats for an input shape may include STereoLithography (STL), Wavefront OBJ, Additive Manufacturing File Format (AMF), ObjDF, Stratasys SLC, Zmodeler Z3D, Lightwave LWO, Autodesk Maya and/or 3D Studio Max, etc.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art.

For example, techniques of separating a portion of a part formed through additive fabrication from a surface were described. These techniques may be applied in other contexts. Any device or process that fabricates objects may utilize techniques for including auxiliary structures as described herein. For example, a part manufacturing via reductive manufacturing may make use of a grip structure as described herein. Such modifications and improvements are intended to be within the spirit and scope of the invention. Accordingly, the foregoing description is by way of example only, and is not intended as limiting.

What is claimed is:

1. A method of additive fabrication wherein a plurality of layers of material are formed on a build platform, the method comprising:
   forming a raft structure in contact with the build platform, the raft structure formed from one or more layers of material and comprising at least one removal pocket adjacent to the build platform, wherein at least a first removal pocket of the at least one removal pocket includes a raised portion, and wherein at least an inner or outer surface of the raised portion decreases in height with increasing distance from an edge of the raft structure; and
   forming additional material in contact with the raft structure.

2. The method of claim 1, wherein the one or more layers of material are substantially laminar and have a thickness between 10 μm and 500 μm.

3. The method of claim 1, further comprising removing the raft structure and the additional material from the build platform.

4. The method of claim 1, further comprising:
   obtaining a representation of a three-dimensional object; and
   generating a representation of a part consisting of the raft structure and the three-dimensional object,
   wherein the raft structure and the additional material are formed in accordance with the representation of the part.

5. The method of claim 4, wherein the raft structure is generated based at least in part on the representation of the three-dimensional object.

6. The method of claim 4, wherein generating the representation of the part comprises computationally combining a representation of a first structure with a representation of the at least one removal pocket using a polygon Boolean algorithm.

7. The method of claim 1, wherein forming the at least one removal pocket comprises creating at least one void space adjacent to the build platform.

8. The method of claim 1, further comprising at least partially filling at least one of the at least one removal pockets with a sacrificial structure.

9. The method of claim 1, wherein at least one of the plurality of layers of material includes a portion of the raft structure and a portion of the additional material.

10. The method of claim 1, wherein the one or more layers of the raft structure and the additional material are formed by actinic radiation incident on a liquid photopolymer that causes a solid photopolymer to form.

11. At least one non-transitory computer readable medium comprising an executable program that, when executed, causes a computer to perform a method of:
   obtaining a representation of a three-dimensional object; and
   generating a representation of a part, the part including a raft structure and the three-dimensional object in contact with one another at a base of the three-dimensional object,
   wherein the raft structure comprises at least one removal pocket,
   wherein at least a first removal pocket of the at least one removal pocket includes a raised portion, and wherein at least an inner or outer surface of the raised portion decreases in height with increasing distance from an edge of the raft structure.

12. The at least one non-transitory computer readable medium of claim 11, wherein the raft structure is generated based at least in part on the representation of the three-dimensional object.

13. The at least one non-transitory computer readable medium of claim 11, wherein the method further comprises:
generating, based at least in part on the representation of the part, a plurality of instructions for an additive fabrication device that instruct the additive fabrication device to fabricate the part.

14. The at least one non-transitory computer readable medium of claim 13, wherein the plurality of instructions further comprise instructions to the additive fabrication device to at least partially fill at least one of the at least one removal pockets with a sacrificial structure.

15. The at least one non-transitory computer readable medium of claim 13, wherein generating the plurality of instructions comprises decomposing the representation of the part into a plurality of layers and generating instructions that instruct the additive fabrication device to form each layer of the plurality of layers in a layerwise sequence.

16. The at least one non-transitory computer readable medium of claim 11, wherein generating the representation of the part comprises computationally combining a representation of a first structure with a representation of the at least one removal pocket using a polygon Boolean algorithm.

* * * * *